July 12, 1932.　　　P. H. CHASE　　　1,867,536

STRAND REENFORCEMENT

Filed April 24, 1931　　6 Sheets-Sheet 1

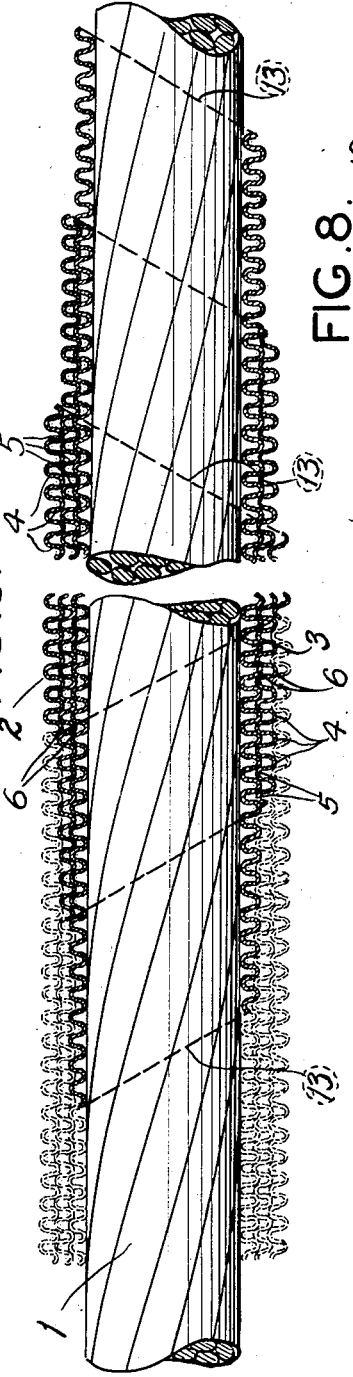
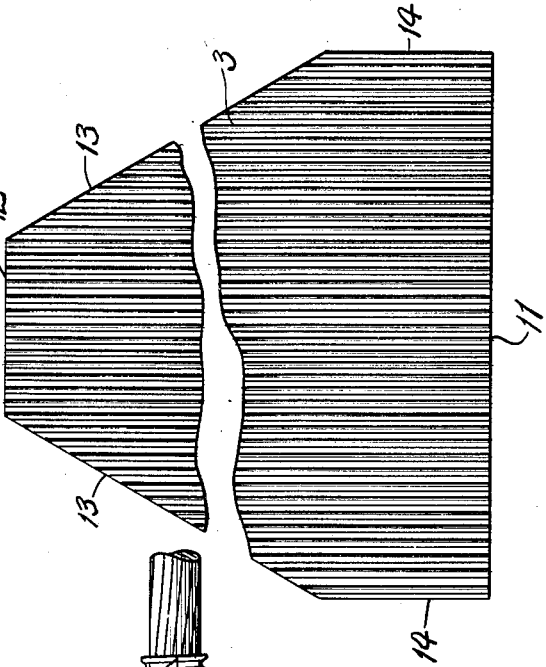
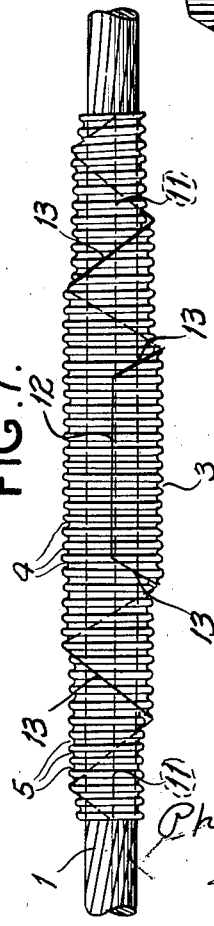

July 12, 1932. P. H. CHASE 1,867,536
STRAND REENFORCEMENT
Filed April 24, 1931 6 Sheets-Sheet 3
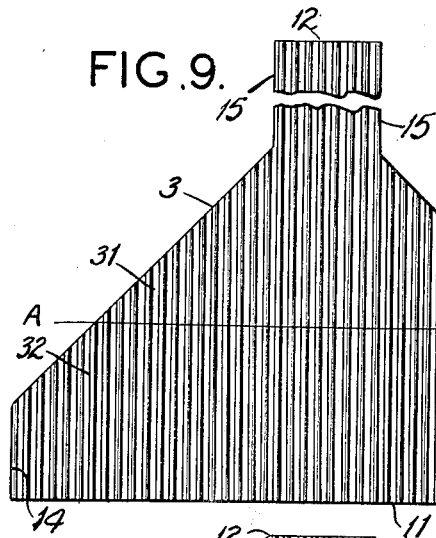
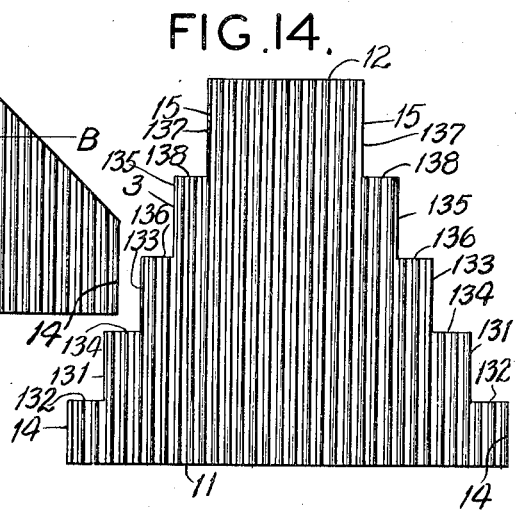
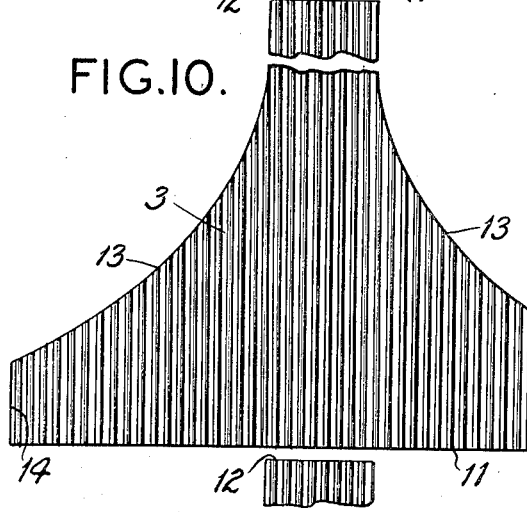
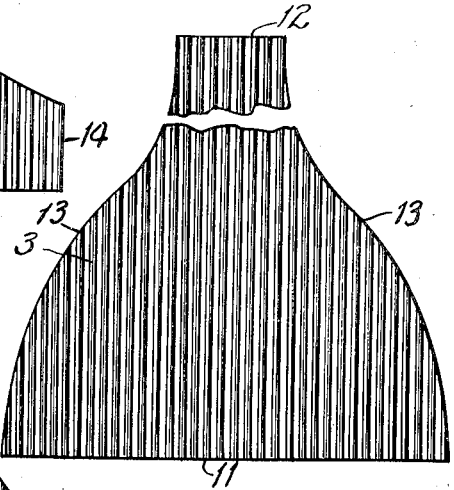
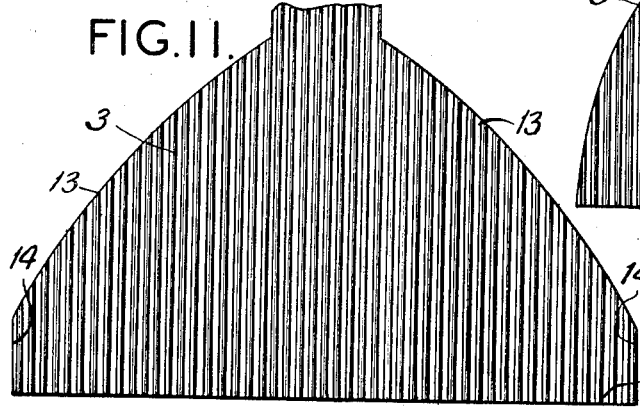

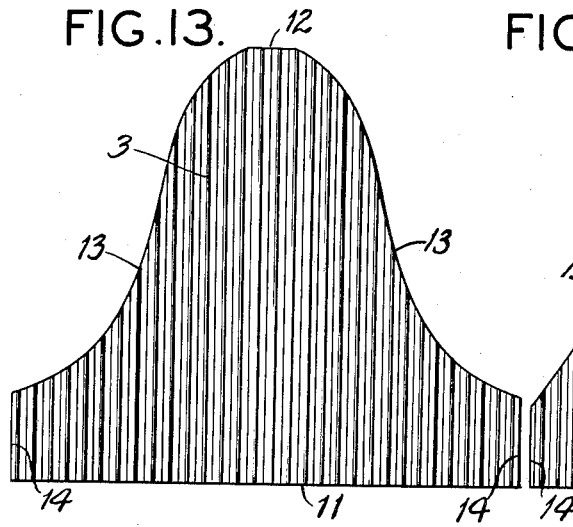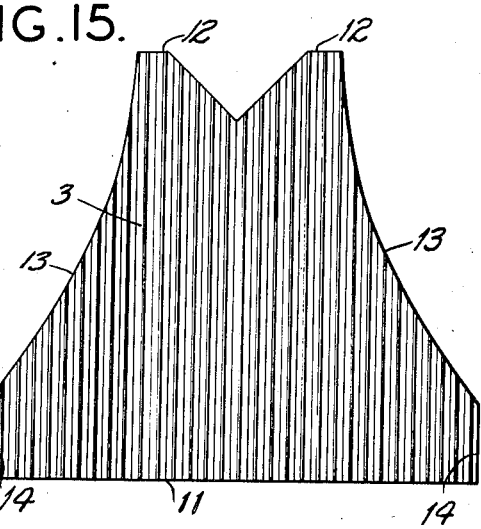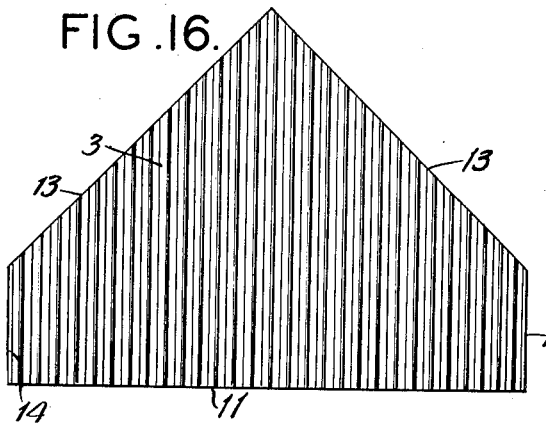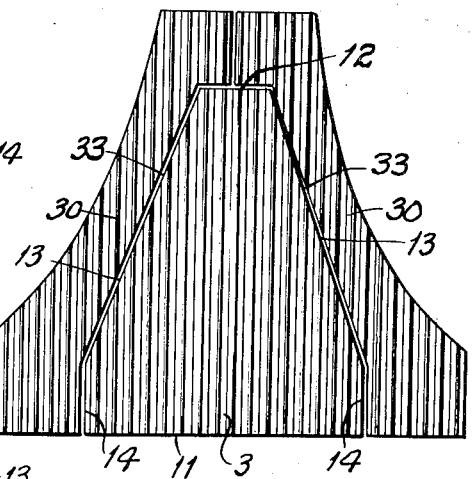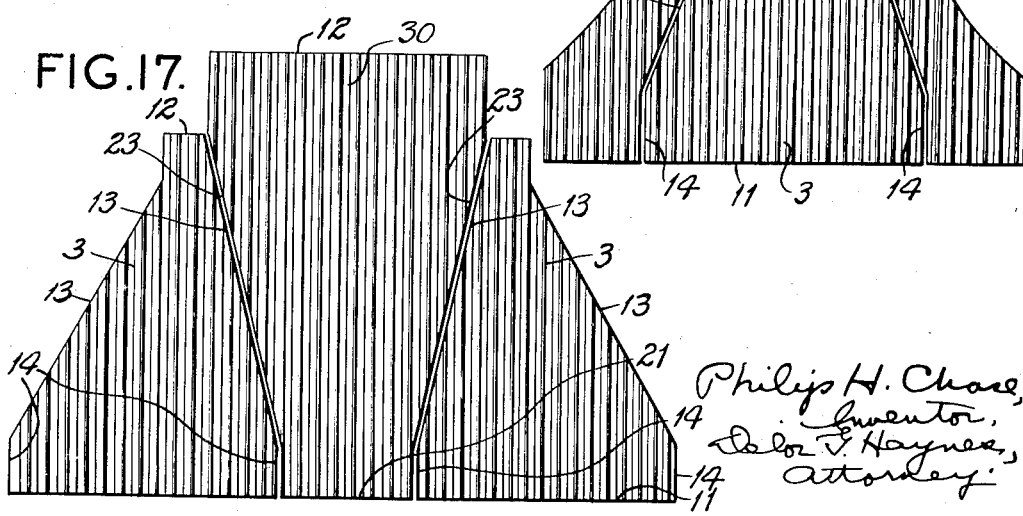

July 12, 1932.  P. H. CHASE  1,867,536
STRAND REENFORCEMENT
Filed April 24, 1931   6 Sheets-Sheet 5
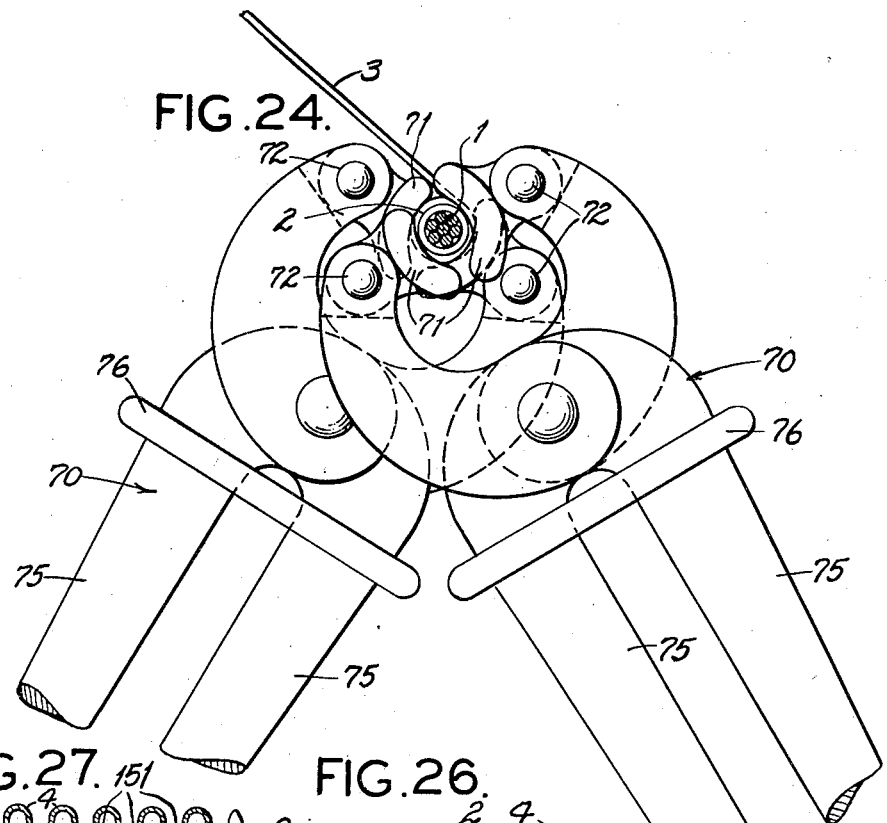
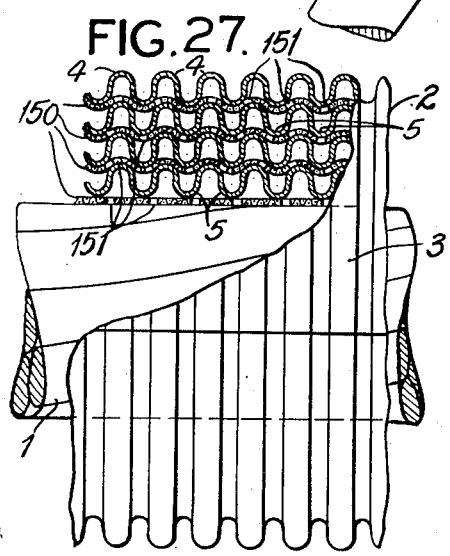
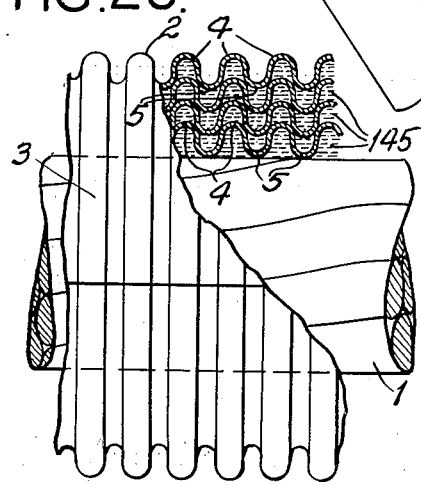
Philip H. Chase,
Inventor,
Delos G. Haynes,
Attorney.

July 12, 1932.  P. H. CHASE  1,867,536
STRAND REENFORCEMENT
Filed April 24, 1931  6 Sheets-Sheet 6
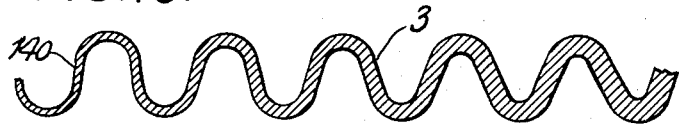
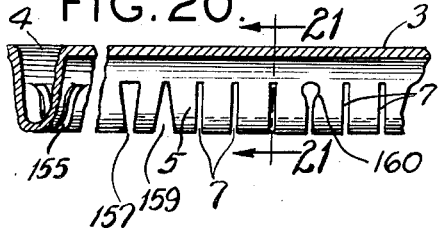
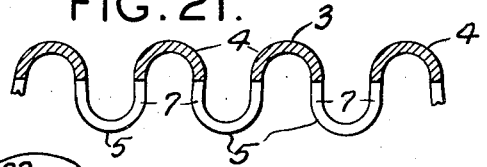
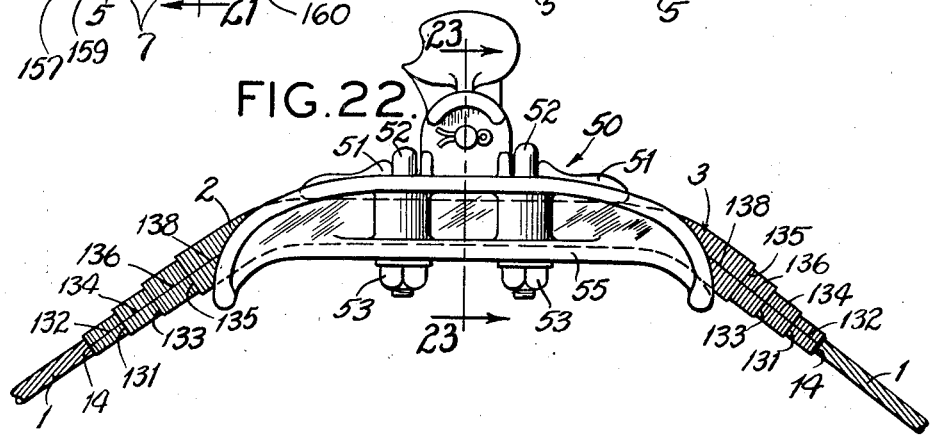
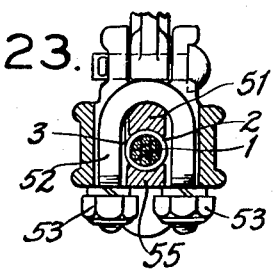
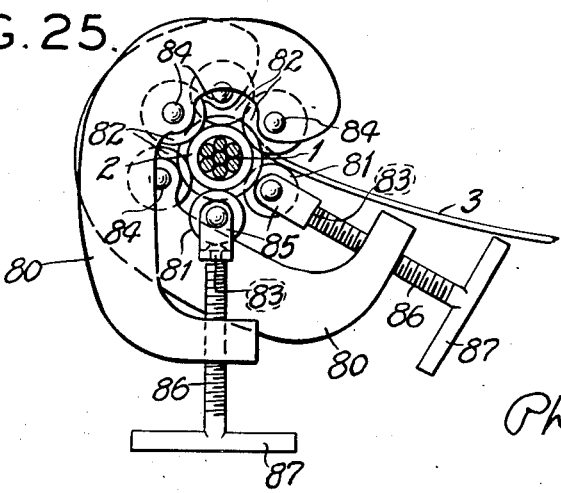
Philip H. Chase,
Inventor.
Attorney.

Patented July 12, 1932

1,867,536

UNITED STATES PATENT OFFICE

PHILIP H. CHASE, OF BALA-CYNWYD, PENNSYLVANIA

STRAND REENFORCEMENT

Application filed April 24, 1931. Serial No. 532,497.

This invention relates to a reenforcement for strands of wire, cable and the like, and with regard to certain more specific features, for use on cables and the like for electric power transmission.

Among the several objects of my invention may be noted the provision of means for increasing the stiffness and/or mass of wire or cable, the provision of means to strengthen the wire or cable where it is subject to flexure and/or alternating bending stresses; the provision of means for reenforcing a wire or cable at or near a point of support or attachment; the provision of means for reducing and/or absorbing and/or damping vibration in wires and cables; and the provision of means for reducing the breakage of wire or cable caused by vibration. Other objects will be in part obvious and in part pointed out hereinafter.

The invention accordingly comprises the elements and combinations of elements, features of construction, arrangements of parts, steps and sequence of steps which will be exemplified in the structure hereinafter described, and the scope of the application of which will be indicated in the following claims.

In the accompanying drawings, in which are illustrated several of various possible embodiments of the invention, Fig. 1 is a side elevation showing one embodiment of my invention, parts being broken away for clarity;

Fig. 6 is a partial longitudinal section taken on line 6—6 of Fig. 4, certain features of the construction being exaggerated for purposes of illustration, the dash lines showing the application of the duplicate shown in Fig. 5;

Fig. 7 is a view similar to Fig. 4 showing another embodiment of the invention;

Fig. 8 is a view similar to Fig. 5 showing the plan view of the sheet used in the Fig. 7 embodiment;

Figs. 9 through 16 show plan views of alternative forms of the sheets such as shown in Figs. 2, 5 and 8;

Fig. 17 is a view similar to Fig. 5 showing a compound arrangement of the invention;

Fig. 18 is a view similar to Fig. 17 showing another compound arrangement;

Fig. 19 is a longitudinal section showing an alternative form of variable thickness sheet;

Fig. 20 is a cross section of an alternative form of sheet, taken parallel to corrugations in said sheet;

Fig. 21 is a section taken on line 21—21 of Fig. 20;

Fig. 22 is a side elevation showing a suspension clamp;

Fig. 23 is a cross section taken on line 23—23 of Fig. 22;

Fig. 24 is an elevation showing apparatus for applying corrugated sheet to cables and the like;

Fig. 25 is an elevation showing another form of tool for applying sheeting to cable and the like; and, Figs. 26 and 27 are views similar to Fig. 1 showing alternative forms of the invention.

Similar reference characters indicate corresponding parts throughout the several views of the drawings.

Figure 1:
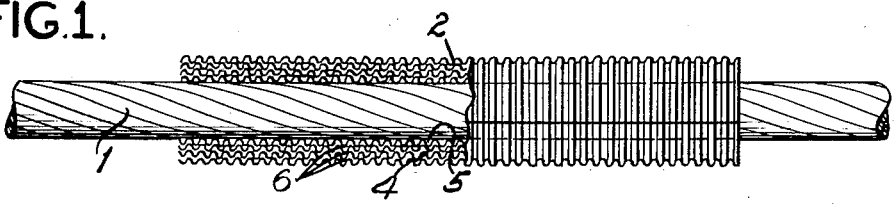
Figure 2:
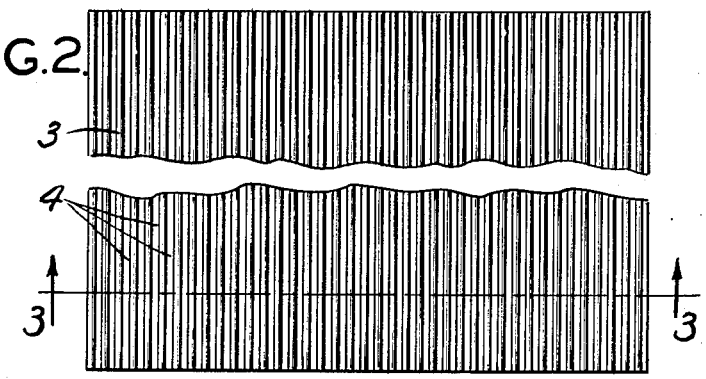
Fig. 2 is a plan view showing a rectangular, corrugated sheet used in the construction of Fig. 1.
Figure 3:
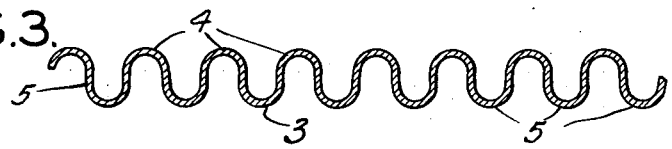
Fig. 3 is a fragmentary cross section taken on line 3—3 of Fig. 2.

In Fig. 1, which illustrates one embodiment of my invention, the cable (a class example of any strand in this art) is designated by numeral 1, surrounding which is placed a sleeve 2 formed from a rectangular sheet of corrugated material 3, shown in plan in Fig. 2, which rectangular sheet appears in section as illustrated in Fig. 3. It will be understood that the wave form shown is exemplary and that analogous wave forms may be used, such as the sine wave and others. The sheet 3 is wrapped around the cable 1 into the form of a sleeve with the axes of the corrugations in planes perpendicular to the axis of the cable, so that the inner corrugations 5 of one layer or turn of sheet 3 register with and lie between the outer corrugations 4 of the layer or turn next inside, while the outer corrugations 4 of one layer or turn lie between the inner corrugations 5 of the layer or turn next outside. Thus the corrugations nest peripherally in themselves. Therefore, there is a continous, peripheral or annular interlocking of the corrugations 4 of each layer with the abutting corrugations 5 of the next adjacent layer, but this interlocked-layer sleeve 2 remains flexible because of the corrugated layer construction. When the cable 1 bends, the corrugations on the outside of the bend will lengthen and flatten while those on the inside of the bend will shorten and rise, and sliding will take place between the surfaces of the corrugations of adjacent layers. Lubricant may be used to facilitate sliding.

The corrugated sheet 3 preferably is of the same metal as the wire or cable but may be of another metal, or may have greater or less unit weight, strength and/or elasticity in order to provide the desired combination of weight and rigidity for the assembly. The corrugated sheet may be made in different thickness and with various corrugations pitches. For example, for aluminum, steel-core cable about three-quarters inch diameter, I have found that aluminum sheet .020 inch thick with a corrugation pitch (from the top of a corrugation 4 to the top of an adjacent corrugation 4) of ¼ inch and a corrugation height (from the top of a corrugation 4 to the top of a corrugation 5) of about .15 inch is suitable.

Figure 4:
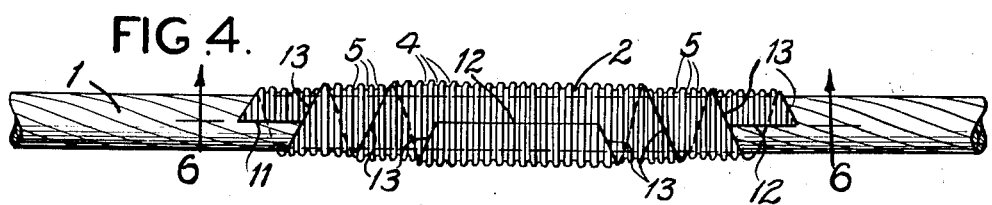
Fig. 4 is a side elevation showing another embodiment of the invention.
Figure 5:
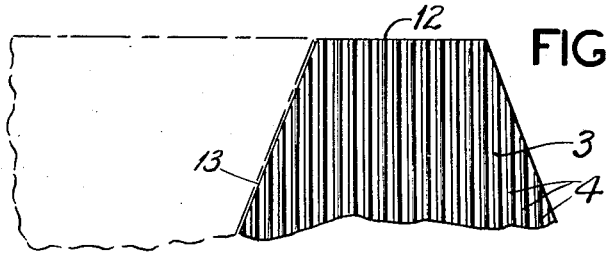
Fig. 5 is a plan view of the trapezoidal sheet used in Fig. 4, the dash lines illustrating a broken away duplicate.
Figure 5:
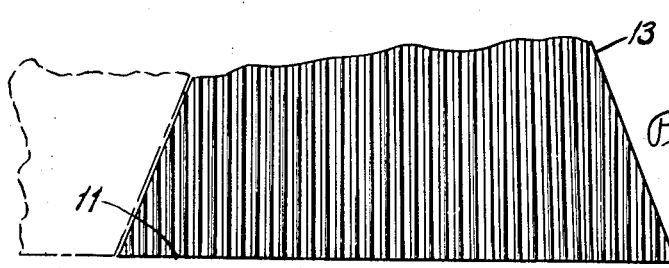

Fig. 4 illustrates another embodiment of the invention in which the trapezoidal-shaped sheet 3 of Fig. 5, with corrugations perpendicular to the parallel edges 11 and 12 is applied to the conductor 1 to form a double-tapered sleeve 2, the long edge 11 being adjacent to the conductor. This embodiment is shown exaggerated in a longtiudianl section by solid lines in Fig. 6. The resulting sleeve 3 has a tapering contour due to the progressively decreased numbers of wrapped layers. This results in a progressively decreasing mass and rigidity of the sleeve from its middle to each of its ends, which is of advantage in many applications where a gradual change is desired from the conditions in the free cable to the maximum reenforcement afforded by the sleeve.

Another embodiment of the tapered sleeve is illustrated in Fig. 7 in which the sheet of Fig. 8 has end edges 14 which are perpendicular to the edge 11 and of such length as to be substantially equal to the perimeter of the first turn of the sleeve 2. The subsequent tapering of the sleeve results from the diagonal edges 13—13 as shown in said Figs. 4 and 5.

Other illustrative but not limiting embodiments of the foregoing form of the invention are illustrated in Figs. 9 to 16 inclusive, in which the corrugated sheets 3 of the figures are of different shapes, particularly in respect to the side edges, and therefore result in the different sleeve shapes as determined by the sheet edges.

In Fig. 9 the length of the end-edges 15, 15 should preferably be equal to the perimeter of one or more of the outer layers of the resulting sleeve.

Figs. 10 and 11 illustrate respectively sheets with curved edges 13, 13. In Fig. 10 the curve is concave and in Fig. 11 the curve is convex. The resulting sleeves are similar to that shown in Fig. 7, except for the different pitch effect of the resulting helical edges and the banding effect of the end edges 15. The Fig. 10 form results in a decreasing helical pitch toward the center of the sleeve and the Fig. 11 form in an increasing helical pitch toward the center of the sleeve.

Figs. 12 and 13 illustrate sheets with reverse curved edges. In Fig. 12 edge 13 is convex adjacent to edge 11 and concave adjacent to edge 12. In Fig. 13 the edge 13 is concave adjacent to end edge 14 and convex adjacent to edge 12. The corresponding sleeves have decrease and increase in helical pitch corresponding to said concave and convex curvatures.

Fig. 14 illustrates a corrugated sheet with end edges 14, 14 and 15, 15 similar to Fig. 9, but with the edges therebetween formed in a series of steps, edges 131, 133, 135 and 137 being perpendicular to edges 11 and 12 and edges 132, 134, 136 and 138 being parallel to said edges. The corresponding sleeve has no smooth helical sheath but comprises a series of right cylinders formed from one piece (see Fig. 22). The length of each of the edges 131, 133, 135 and 137 is preferably equal to the perimeter of the layers beneath after winding; hence the successive lengths 131, 133, 135, 137 and 15 gradually increase.

Figs. 15 and 16 show other examples of shapes of sheets which may be found desirable. The resulting sleeves afford in some situations, better mid-sleeve contour for attaching clamps or the like.

It is apparent from Figs. 9–16 and the description above, that any desired size and contour of sleeve can be obtained by choice of the size and shape of the corrugated sheet, and the variation can be obtained without increasing deleteriously the stiffness of the sleeve as would be the case were the sheets non-corrugated. In case it is desired to make more gradual the change in conditions along the sleeve at the edges, as one method the sheet 3 can be rolled thinner near the edges, as illustrated at 140 in Fig. 19.

A method is illustrated in Figs. 20 and 21 for making the corrugated sheet 3 more flexible for bending into the form of sleeve 2 about the conductor and/or making part or all of the sleeve more flexible. The inner corrugations 5, namely, those which will be on the inside of the turn when the sheet 3 is applied, are slitted with a series of lateral, narrow slits or cuts 7 running crosswise of the corrugations. These slits or cuts are illustrated at numeral 7 as running perpendicularly to the corrugations, but may all or in part run diagonally thereto (see numeral 155; Fig. 20). The slits also may be provided over all of the sheet 3 or cross only a portion of it, such as for example at or near the side edges, or adjacent the edge 11. The slits or cuts may have parallel sides as illustrated at numeral 7 or they may be upwardly divergent as illustrated at numeral 157 or downwardly divergent as illustrated at numeral 159. Or bulbous ends may be employed on the slits as shown at numeral 160 in order to be helpful in avoiding concentration of stresses at sharp corners.

In order to avoid the use of a single large corrugated sheet 3, the desired size sleeve may be built up by applying two or more similarly-shaped corrugated sheets simultaneously directly on top of the other; or they may be used seriatim. For example, referring to Fig. 9, sheet 3 would be cut into two parts, 31 and 32, abutting at line A—B. The two sheets 31 and 32 might be the same or different material, or different thicknesses, for example.

Two other methods of avoiding unduly large sheets are illustrated in Figs. 17 and 18. In the first of these methods, the two sheets 3, 3 of Fig. 17 are applied to the cable with the adjacent inner edges 14, 14 spaced apart slightly greater than the length of edge 21. Then sheet 30 is applied and the three sheets form the protecting sleeve. It will be noted that in the resulting sleeve, corrugations at and adjacent the edges 23, 23 of sheet 30 shall overlap and interlock with the corrugations underlying and adjacent the edges 13, 13 of sheets 3, 3 and thus the three sheets shall form a continuous sleeve. This will be clear if it be considered that were the three pieces 3, 3 and 30 formed integrally, each layer of wrapped sheeting would interlock corrugations with the underlying layer and the fact that the sheets have the line of separation therebetween does not change this fact. The point is further illustrated in Figs. 5 and 6 where the dash lines show how an adjacent sheet (nested on a bias; Fig. 5) will wrap and interlock (Fig. 6).

In the second of these two methods the sheet 3 of Fig. 18 is applied to the cable and then the two sheets 30, 30 are applied with their edges 33, 33 abutting the edges 13, 13 of sheet 3. In this case also the corrugations of the abutting and overlapping sheets adjacent the edges interlock and there is formed a single sleeve.

After the sleeve winding has been completed it is preferably restrained from unwrapping by a binding and/or clamp over part or all of the central or free portion. The binding may be for example in the form of one or more servings of wire or tape.

When a clamp is used the type will depend, for example, upon whether it is used merely as a clamp, as a suspension clamp or as a dead-end clamp. In Fig. 22 is illustrated one type of suspension clamp 50. This Fig. 22 also shows how the structure of Fig. 14 appears wrapped. The clamp 50 is of the type to be utilized in electric power lines on the lower end of an insulator string or the like. The cable 1 enclosed in the sleeve 2 (the type sleeve illustrated in Fig. 14) is supported in the saddle 55 and the keeper 51 bears on the upper portion of the sleeve. The clamping of the sleeve between the saddle 55 and the keeper 51 is effected by means of the two U-bolts 52, and the nuts 53.

One method and apparatus for applying the corrugated sheet to the cable is shown in Fig. 24. Preferably two or more pairs of tongs 70 are utilized. One or more of these clamp the portion of the sheet already bent into place to prevent it from unwrapping, while the other or others are rotated about the conductor to apply more of the corrugated sheet. Then the latter pair or pairs of tongs are utilized temporarily to clamp the applied portion of the sheet and the former pair or pairs of the tongs are rotated about the conductor to apply more of the sheet. By this step-by-step method the entire sheet is applied, and temporary clamps or servings may be applied to prevent unwrapping until the permanent clamp or serving is placed. A pair of tongs is clamped in place by moving the ring 76 outwardly along the handles 75, 75 until it jams. The jaws 71 are free to rotate on the pins 72 and are grooved to conform to the corrugations of the sheet.

Another tool for applying the sleeve is illustrated in Fig. 25. In the frame 80 are mounted two rollers 82, which rotate on the pins or bearings 84. A similar but adjustable roller 81 is mounted in a clevis 85, and rotates on pin or bearing 83. The clevis 85 is attached to the threaded shaft 86 by swiveling means, and this shaft is threaded through the frame 80 and has a handle 87. These three rollers are disposed preferably substantially equidistantly about the conductor and sleeve and are grooved to conform to the corrugations of the sheets. By turning the handle 87 the roller 81 is made to approach or recede from the rollers 82, 82. The sheet is applied by the rotation of one or more of the tools, with the handle 87 turned to retract the roller 81 as the diameter of the sleeve increases, during which process the desired degree of pressure on the sleeve is secured by similar advance and retraction of roller 81.

As above stated, during the application of the sleeve, there may be applied a coating of semi-solid or liquid material such, for example, as grease or oil to serve as a lubricant between the portions of the adjacent sleeve layers 6 which are in contact (Fig. 1). If, on the other hand, it is desired to increase the resistance to sliding of the adjacent layers, the relatively soft coating may be of a compound of high viscosity, such as glycerine. This increase in resistance may be found desirable if energy and/or stresses are to be absorbed by friction. Fig. 26 illustrates the interposition of a compound 145.

In some applications similar results can be preferably secured by applying in conjunction and interleaved with the corrugated sheet a sheet of fabric or paper, preferably of the same size and shape as the corrugated sheet, in order to afford a cushion and/or spacer between the layers of the sleeve. Such a sheet of fabric or paper 150 may be impregnated with the desired liquid or compound. Such a construction is shown in Fig. 27. Thus there is afforded additional means for retaining the liquid or compound and for absorbing energy from vibrations of the cable. The paper or fabric sheet may also be perforated to facilitate movement of the liquid or compound (see numeral 151). The use of a sheet of fabric or paper may also be extended to the space between the surface of the cable and the first layer of the sleeve, as shown at numeral 153 in Fig. 27, in order, particularly in stranded cables, to provide a cushion or liner which will prevent abrasion or cutting of the strands by the corrugations or vice-versa. Such a cushion or liner between the cable and the sleeve also can be in the form of a wrapping of tape, of fabric, or paper, or preferably of the same metal, as the outer layer of strands of the cable.

The term wire is to be considered as used herein generically to refer to wire and similar lines, including cable.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. A reenforcement for damping vibrations in wire comprising a plurality of corrugated layers of reenforcing material wrapped about the wire, the reenforcement having edges which converge.

2. A reenforcement for damping vibrations in wire comprising a plurality of corrugated layers of reenforcing material wrapped about the wire, the reenforcement having edges which converge, said corrugations nesting.

3. A reenforcement for damping vibrations in cable comprising layers of corrugated material wound one over the other and surrounding the cable, the reenforcement being in contact with the cable, the corrugations being positioned peripherally of said cable.

4. A reenforcement for wire comprising at least one sheet of corrugated material having a biased edge and spirally wrapped on the wire, whereby said biased edge is positioned helically around said wire after wrapping.

5. A reenforcement for wire comprising at least one sheet of material having a biased edge and spirally wrapped on the wire, corrugations in said sheet arranged in successive spirals and nested in corrugations of the spirals therebeneath, whereby said biased edge is positioned helically about said wire upon wrapping.

6. A reenforcement for wire comprising a corrugated sheet having a stepped edge wrapped about the wire, the corrugations being positioned laterally to the center line of the wire, successive turns of the corrugations being nested within each other.

7. A reenforcement for wire comprising a corrugated sheet having a curved edge and wrapped about the wire, the corrugations being positioned laterally to the center line of the wire, successive turns of the corrugations being nested within each other.

8. A reenforcement for wire comprising a corrugated sheet having a concavely curved edge wrapped about the wire, the corrugations being positioned laterally to the center line of the wire, successive turns of the corrugations being nested within each other.

9. A reenforcement for wire comprising a corrugated sheet having a convexly curved edge wrapped about the wire, the corrugations being positioned laterally to the center line of the wire, successive turns of the corrugations being nested within each other.

10. A reenforcement for wire comprising a corrugated sheet having a reverse curved edge wrapped about the wire, the corrugations being positioned laterally to the center line of the wire, successive turns of the corrugations being nested within each other.

11. A reenforcement for wire, comprising a corrugated sheet wrapped about said wire with successive turns of the corrugations nesting within one another, said corrugations being laterally slotted on one side.

12. A reenforcement for damping vibrations in wire comprising at least one corrugated sheet wrapped on the wire and contacting therewith, successive layers having nested corrugations.

13. A reenforcement for wire, comprising at least one corrugated sheet wrapped on the wire, successive layers having nested corrugations, said sheet becoming thinner toward its edge to provide a relatively smooth contour on the reenforcement.

14. A reenforcement for wire comprising a corrugated sheet wrapped about the wire in successive turns, the corrugations of successive turns nesting in one another and a material inserted between the turns adapted to increase the friction therebetween.

15. A reenforcement for wire comprising a plurality of corrugated sheets having at least some juxtaposed, biased edges, said sheets being wrapped about a wire, the corrugations nesting between successive turns of the wrapping, both as to a single sheet and between different sheets of the plurality.

In testimony whereof, I have signed my name to this specification this seventeenth day of April, 1931.

PHILIP H. CHASE.